United States Patent
Perlmutter et al.

(10) Patent No.: US 9,467,518 B2
(45) Date of Patent: Oct. 11, 2016

(54) SYSTEM, A METHOD AND A COMPUTER PROGRAM PRODUCT FOR AUTOMATED REMOTE CONTROL

(75) Inventors: Amiram Perlmutter, Haifa (IL); Eran Karpen, Haifa (IL); Omri Lavie, Haifa (IL); Shalev Holy, Haifa (IL); Ronen Sasson, Kadima (IL)

(73) Assignee: CommuniTake Technologies Ltd., Yokneam (IL)

( * ) Notice: Subject to any disclaimer, the term of this patent is extended or adjusted under 35 U.S.C. 154(b) by 0 days.

(21) Appl. No.: 13/201,406

(22) PCT Filed: Feb. 15, 2010
(Under 37 CFR 1.47)

(86) PCT No.: PCT/IL2010/000135
§ 371 (c)(1),
(2), (4) Date: Dec. 27, 2011

(87) PCT Pub. No.: WO2010/092585
PCT Pub. Date: Aug. 19, 2010

(65) Prior Publication Data
US 2012/0191770 A1    Jul. 26, 2012

Related U.S. Application Data

(60) Provisional application No. 61/152,760, filed on Feb. 16, 2009.

(51) Int. Cl.
  *G06F 15/16*    (2006.01)
  *H04L 29/08*    (2006.01)

(52) U.S. Cl.
  CPC ............. *H04L 67/125* (2013.01); *H04L 67/04* (2013.01); *H04L 67/20* (2013.01); *H04L 67/34* (2013.01); *G08C 2201/33* (2013.01); *G08C 2201/42* (2013.01)

(58) Field of Classification Search
  CPC ... H04L 67/125; H04L 67/36; H04L 67/025; H04L 41/22; H04L 12/2602; G06F 11/328; G06F 11/3438; G06F 11/2294; G06F 11/0748; G06F 11/00; G06F 2201/865; G06F 3/04845; G06F 3/1454; G06F 3/04842; G06F 8/68; H04N 21/4227
  USPC ........ 709/212–213, 216, 219, 227, 230–232, 709/246, 248, 200, 201
  See application file for complete search history.

(56) References Cited

U.S. PATENT DOCUMENTS 5,758,110 A * 5/1998 Boss et al. .................... 715/751
5,949,412 A * 9/1999 Huntsman ..................... 715/740

(Continued)

FOREIGN PATENT DOCUMENTS

EP          1653423 A1 * 5/2006
WO    WO 2006077283 A1 * 7/2006
WO       2007085603 A2    8/2007

OTHER PUBLICATIONS

International Search Report for PCT Application No. PCT/IL10/00135 mailed on Jun. 1, 2010.

*Primary Examiner* — Douglas Blair
*Assistant Examiner* — Imran Moorad
(74) *Attorney, Agent, or Firm* — Lowenstein Sandler LLP; Ariel Reinitz

(57) ABSTRACT

A method enables automated remote control of a remote device from a local device connected to the remote device over a network. The method includes executing a set of one or more commands on the remote device by invoking a macro on the local device. Invoking the macro causes the local device to send said the set of commands over the network to the remote device.

20 Claims, 7 Drawing Sheets

(56) References Cited

U.S. PATENT DOCUMENTS

| | | | |
|---|---|---|---|
| 6,208,341 B1* | 3/2001 | van Ee et al. ................ 715/716 |
| 6,226,407 B1* | 5/2001 | Zabih ...................... G06T 7/001 |
| | | 382/209 |
| 6,304,895 B1* | 10/2001 | Schneider et al. ............ 709/203 |
| 7,558,862 B1* | 7/2009 | Tyukasz et al. .............. 709/227 |
| 7,752,055 B1* | 7/2010 | Partezana .............. G06Q 30/02 |
| | | 705/1.1 |
| 2003/0002638 A1* | 1/2003 | Kaars ...................... 379/110.01 |
| 2003/0141987 A1* | 7/2003 | Hayes ...................... 340/825.72 |
| 2004/0145605 A1* | 7/2004 | Basu et al. ................... 345/740 |
| 2005/0108751 A1* | 5/2005 | Dacosta .......................... 725/39 |
| 2005/0198247 A1* | 9/2005 | Perry et al. .................. 709/223 |
| 2006/0037063 A1* | 2/2006 | Clemmons ............. H04L 63/10 |
| | | 726/4 |
| 2006/0107212 A1* | 5/2006 | Lovat et al. .................. 715/700 |
| 2006/0114944 A1* | 6/2006 | Kim .................... H04N 21/235 |
| | | 370/516 |
| 2006/0142878 A1* | 6/2006 | Banik et al. .................... 700/17 |
| 2006/0161865 A1* | 7/2006 | Scott et al. ................... 715/810 |
| 2006/0230105 A1* | 10/2006 | Shappir et al. ............... 709/203 |
| 2007/0005795 A1* | 1/2007 | Gonzalez ..................... 709/232 |
| 2007/0136693 A1* | 6/2007 | Lilleness et al. ............. 715/835 |
| 2008/0183800 A1* | 7/2008 | Herzog et al. ............... 709/202 |
| 2008/0201611 A1* | 8/2008 | Bassin ................ G06F 11/3604 |
| | | 714/37 |
| 2009/0018890 A1* | 1/2009 | Werth et al. ...................... 705/9 |
| 2009/0033744 A1* | 2/2009 | Frantz ................ G01N 21/8806 |
| | | 348/148 |
| 2009/0298535 A1* | 12/2009 | Klein et al. ................. 455/556.1 |
| 2009/0300131 A1* | 12/2009 | Gantman et al. ............. 709/208 |
| 2009/0307600 A1* | 12/2009 | Arthur ................ G06F 11/3664 |
| | | 715/740 |
| 2010/0037088 A1* | 2/2010 | Krivopaltsev et al. ........... 714/4 |
| 2010/0174812 A1* | 7/2010 | Thomas et al. .............. 709/224 |
| 2013/0273853 A1* | 10/2013 | Reed ...................... H04W 24/08 |
| | | 455/67.11 |
| 2013/0347050 A1* | 12/2013 | Friel ...................... H04N 17/00 |
| | | 725/133 |

\* cited by examiner

SYSTEM, A METHOD AND A COMPUTER PROGRAM PRODUCT FOR AUTOMATED REMOTE CONTROL

CROSS-REFERENCE TO RELATED APPLICATIONS

This application is a National Phase Application of PCT International Application No. PCT/IL2010/000135 entitled "A system, a Method and a Computer Program Product for Automated Remote Control", published on Aug. 19, 2010 as International Publication No. WO 2010/092585, which claims priority of U.S. Application No. 61/152,760 entitled "A System, a Method and a Computer Program Product for Automated Remote Control", filed on Feb. 16, 2009, both of which are incorporated herein by reference in their entirety.

FIELD OF THE INVENTION

The present invention relates to mobile devices for communication. More particularly, the present invention relates to a system, a method and a computer program product for automated remote control, which may be suitable, for example, for support management.

BACKGROUND OF THE INVENTION

Technical assistance to users of mobile devices, and especially of mobile phones, and more specifically of smart phones, may present several problems. Often, in order to provide timely support to a user of such a device, it is not possible or convenient to require the user to bring the device to a support center. Therefore, it is often desirable to provide support remotely, without face-to-face contact between the user and a technical support representative.

For example, technical support regarding a mobile device may be provided verbally in the form of a standard telephone conversation via the device. For example, a client seeking assistance with a problem may use the mobile device to call a technical support representative at a technical support center. The support representative may conduct a conversation with the client to identify the problem and provide a solution. For example, the representative may talk the client through one or more steps of operation of the device. The representative may typically be assisted by a printed or electronic guide to the device in conducting the conversation. However, the representative does not directly access the device, or data stored on the device, to ascertain the current status of the device or to operate it. Thus, the client must report the current status of the device to the representative, and perform actions on the device in response to the representative's instructions. Therefore, service may be time consuming or inefficient when verbal communication regarding the device is difficult. For example, the client may not be sufficiently familiar with the device, may not be sufficiently technically skilled, or may not be sufficiently fluent in the language spoken by the representative to enable an efficient and effective conversation. In addition, the configuration of the device may vary from client to client, further complicating verbal communication regarding the device.

Alternatively, support may involve some degree of remote operation of the device by a remote service representative. For example, a service representative may diagnose the device or send data to the device that is installed in the device. For example, such data may include firmware programming or configuration data. However, a decision regarding what data to send may depend on verbal communication as described above, or rely on images acquired by an external video camera that photographs the .device, or on a predefined rules (e.g. for a new device). Often, such remote operation may be based on the Open Mobile Alliance Device Management (OMA-DM) standard that enables remote diagnostics and reconfiguration via Short Message Service (SMS) messages. This standard defines a client application that may reside on the device and can change a basic configuration upon receiving a specific SMS message. Such diagnostic and reconfiguration operation is typically limited to extremely low levels and does not address higher level user-related operation.

Thus, there is a need for a simple and effective way for providing technical and customer support to users of mobile devices.

It is an aim of the present invention to provide for remote operation of mobile devices in a simple and effective manner.

Other aims and advantages of the present invention will become apparent after reading the present invention and reviewing the accompanying drawings.

SUMMARY OF THE INVENTION

There is thus provided, in accordance with some embodiments of the present invention, a method for automated remote control of a remote device from a local device connected to the remote device over a network. The method includes executing a set of one or more commands on the remote device by invoking a macro on the local device causing the local device to send the set of one or more commands over the network to the remote device.

Furthermore, in accordance with some embodiments of the present invention, the method includes synchronizing the execution of the set of one or more commands on the remote device with a current status of the remote device.

Furthermore, in accordance with some embodiments of the present invention, the method includes determining the current status of the remote device by analyzing data from the remote device.

Furthermore, in accordance with some embodiments of the present invention, the step of analyzing data from the remote device includes analyzing an image displayed on the remote device.

Furthermore, in accordance with some embodiments of the present invention, the set of one or more commands includes a command to modify an image displayed on the remote device.

Furthermore, in accordance with some embodiments of the present invention, the method includes analyzing on the local device user-modified data retrieved from the remote device.

Furthermore, in accordance with some embodiments of the present invention, the macro includes a command whose execution depends on a predetermined condition.

There is further provided, in accordance with some embodiments of the present invention, a computer program product stored on a non-transitory tangible computer readable storage medium for automated remote control of a remote device from a local device connected to the remote device over a network. The computer program includes code for executing a set of one or more commands on the remote device by invoking a macro on the local device, causing the local device to send the set of one or more commands over the network to the remote device.

Furthermore, in accordance with some embodiments of the present invention, the computer program product includes computer code for synchronizing the execution of the set of one or more commands on the remote device with a current status of the remote device.

Furthermore, in accordance with some embodiments of the present invention, the computer program product includes computer code for determining the current status of the remote device by analyzing data from the remote device.

Furthermore, in accordance with some embodiments of the present invention, the computer code for analyzing data from the remote device includes computer code for analyzing an image displayed on the remote device.

Furthermore, in accordance with some embodiments of the present invention, the set of one or more commands includes a command to modify an image displayed on the remote device.

Furthermore, in accordance with some embodiments of the present invention, the computer program product includes computer code for analyzing on the local device user-modified data retrieved from the remote device.

Furthermore, in accordance with some embodiments of the present invention, the macro includes a command whose execution depends on a predetermined condition.

There is further provided, in accordance with some embodiments of the present invention, a system for automated remote control of a remote device over a network. The system includes a local device connected to the network and including a processor programmed to execute a set of one or more commands on the remote device by invoking a macro on the local device causing the local device to send the set of one or more commands over the network to the remote device.

Furthermore, in accordance with some embodiments of the present invention, the processor is programmed to synchronize the execution of the set of one or more commands on the remote device with a current status of the remote device.

Furthermore, in accordance with some embodiments of the present invention, the processor is programmed to determine the current status of the remote device by analyzing data from the remote device.

Furthermore, in accordance with some embodiments of the present invention, the data includes an image displayed on the remote device.

Furthermore, in accordance with some embodiments of the present invention, the set of one or more commands includes a command to modify an image displayed on the remote device.

Furthermore, in accordance with some embodiments of the present invention, the processor is programmed to analyze user-modified data retrieved from the remote device.

Furthermore, in accordance with some embodiments of the present invention, the macro includes a command whose execution depends on a predetermined condition.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

Figure 1:
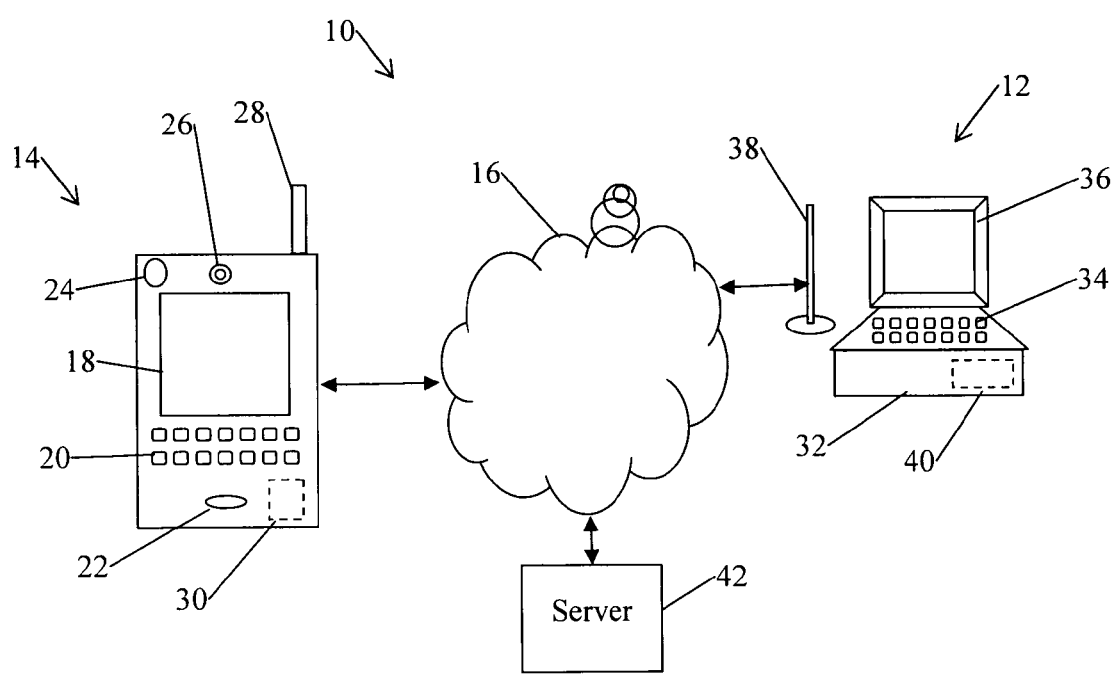
FIG. 1 shows schematically a system for remote device management in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

In accordance with embodiments of the present invention, a remote device may be automatically and remotely controlled from a local device. The remote device and the local device may be connected over a network. For example, the remote device may include a fixed or mobile device (such as a mobile telephone) capable of wired or wireless communication. The local device may be, for example, a remote station operated by a station user, such a service or sales representative of a mobile device provider. Control may be accomplished by invoking one or more macros on the local device. Each macro includes a set or sequence of commands. The macro may be invoked, for example, by the station user or a computer program running on a processor of the local device. Invoking the macro may cause the set of commands to be sent over the network to remote device, where the commands are executed. For example, a macro may enable automated solution of a problem.

The execution of the commands may be synchronized with a current status of the remote device. For example, the commands may include analyzing data from the remote device, such as an image displayed on the remote device, in order to determine the status of the remote device. Execution of the commands may be dependent on one or more predetermined conditions. For example, the predetermined conditions may be related to the current status of the remote device. Thus, depending on the conditions, alternative branches of the macro may be executed. Commands may operate the remote device. For example, a command may modify data stored in the remote device, or may modify an image displayed on the remote device.

A system for remote management of a mobile device, in accordance with embodiments of the present invention, includes a local device, such as a remote support station. For example, the remote support station may include one or more computers mobile or stationary computers programmed so as to provide remote support to a remote device, such as a mobile device. A mobile device may include, for example, a cellular telephone, a mobile smart phone, or any other device that enables a user to communicate with other remote devices. The remote support station and the mobile device communicate over a network. The network may include, for example, a cellular or other mobile telephone communications network, a satellite communications network, the Internet, a standard telephone network, or any combination of the above.

FIG. 1 shows schematically a system for remote device management in accordance with some embodiments of the present invention. Remote mobile device management system 10 includes remote support station 12. Remote support station 12 may communicate with one or more mobile devices 14 via network 16. Remote mobile device management system 10 may also include server 42.

A mobile device 14 may typically include one or more components for enabling a user to communicate with other communications devices. For example, mobile device 14 may include a microphone 22, a speaker, 24, and a camera 26. Mobile device 14 typically includes one or more output devices, such as a screen, indicator light, or audible indication, represented collectively by display screen 18. For example, a menu of possible user-initiated actions may be displayed on display screen 18. Mobile device 14 may also include one or more finger-operated or otherwise operated input devices including such components as, for example, pushbuttons, keys, switches, mouse, trackball, or voice or optically operated sensors, represented collectively by keyboard 20. Alternatively, at least some of the function of keyboard 20 may be combined with the function of display screen 18 in a single device, such as a touch screen. Mobile device 14 may be provided with one or more communications components for enabling communication via network 16. Such communications components, which may include, for example, an antenna, a plug or socket, or an optical or photonic communications device, are represented by antenna 28. Mobile device 14 also includes one or more data storage devices 30. Data storage device 30 may be configured to store data such as configuration parameters and data, and programming. For example, data storage device 30 may be programmed with a device client application program.

Remote station 12 includes a processor 32. Processor 32 may incorporate or communicate with one or more data storage devices 40. Processor 32 may operate in accordance with program instructions and data stored on data storage device 40. For example, data storage device 40 may include a technical support client application program or a sales client application program. Remote station 12 includes one or more input devices represented collectively by keyboard 34, via which a service representative or other station user may input data or instructions. One or more output devices, represented collectively by station screen 36, may communicate various data to a station user. Remote station 12 includes one or more components, represented by antenna 38, for communicating via network 16.

Remote mobile device management system 10 may also include server 42. For example, server 42 may include a processor and associated data storage device that communicate with network 16. For example, server 42 may be programmed with a remote mobile device management server application program. Alternatively, the some or all of the capabilities of server 42 may be incorporated into remote station 12.

In accordance with embodiments of the present invention, a station user may operate remote station 12 so as to communicate via network 16 with mobile device 14. Communication may be controlled by server 42. Once communication is established, the station user may operate remote station 12 so as to operate mobile device 14. For example, remote station 12 may obtain data from mobile device 14 that indicates a status of mobile device 14. For example, remote station 12 may obtain from mobile device 14 an image that is displayed on display screen 18 of mobile device 14. For example, the obtained image may be displayed as an image on station screen 36 of remote station 12. A station user, who may be, for example, a technical support representative, a sales representative, or the device user, may then examine the contents of the image displayed and ascertain a current status of mobile device 14. The station user may also continue to monitor the contents of the displayed image or other obtained data so as to observe operation of mobile device 14. During this time, the station user may also communicate with a device user who is operating mobile device 14. For example, the station user and the device user may maintain communication by maintaining a spoken conversation or via text messages.

Remote station 12 may be operated to access and analyze data from mobile device 14. For example, the data may include, in addition to a configuration state, access to user-modified data created by operation of mobile device 14 by the device user. Such user-modified data may include, for example, data created in the course of running an application on mobile device 14, operations being performed by the application, or content of a data file modified by the device user during operation of mobile device 14.

For example, on the basis of information obtained by observation of the monitored data, the station user may identify a problem with operation of mobile device. Alternatively, the station user may observe how the device user operates mobile device 14. For example, in response to observing a status or operation of mobile device 14, the station user may instruct the device user in the operation of mobile device 14 in order to correct a problem or to instruct the device user as to proper operation of mobile device 14. Alternatively, the station user may observe that an optional add-on capability or program may be beneficial to the devise user. The station user may then, for example, offer the add-on capability to the devise user for sale.

Alternatively or in addition, remote mobile device management system 10 may enable the station user to operate or control one or more functions of mobile device 14 via remote station 12. For example, the station user may operate remote station 12 so as to change a setting of or install programming instructions into mobile device 14. For this purpose, the station user may invoke, or initiate execution of, a macro, script, or flow (all hereinafter referred to as a "macro") via remote station 12. For example, the macro may execute a set of instructions for diagnosing or correcting a problem, or for installing or setting up an application or content. For example, the instructions of the macro may include obtaining data from mobile device 14 and selecting a subsequent instruction based on the obtained data.

In addition, processor 32 of remote station 12 may analyze the obtained data so as to parameterize the current status of mobile device 14. For example, processor 32 may apply image processing technology in order to extract data from an obtained image. For example, processor 32 may apply optical character recognition (OCR) technology to an obtained image in order to extract text data from the image. The content of the text data may be used as input for a decision step of a macro to determine which subsequent steps of the macro to execute.

Processor 32 may be configured to determine the quality and speed of communication between mobile device 14 and remote station 12 via network 16. On the basis of the determined quality and speed of communication, processor 32 may then regulate the content and quantity of data communicated between mobile device 14 and remote station 12. The data content and quantity of transferred data may be regulated to as to achieve an optimum communication between mobile device 14 and remote station 12. An optimum communication may prevent unnecessarily slow operation of remote mobile device management system 10 by transferring more data than can be efficiently transferred. On the other hand, an optimum communication may ensure that the maximum amount of data is transferred consistent with the current quality and speed of communication over network 16.

A method of remote mobile device management in accordance with embodiments of the present invention may include establishing contact between a device user of mobile device 14 and a station user at remote station 12. Under some circumstances, the device user and the station user may be identical. For example, a user of a mobile device may operate an appropriate program designed for user self-assistance on a computer in order to access the mobile device.

Figure 2A:
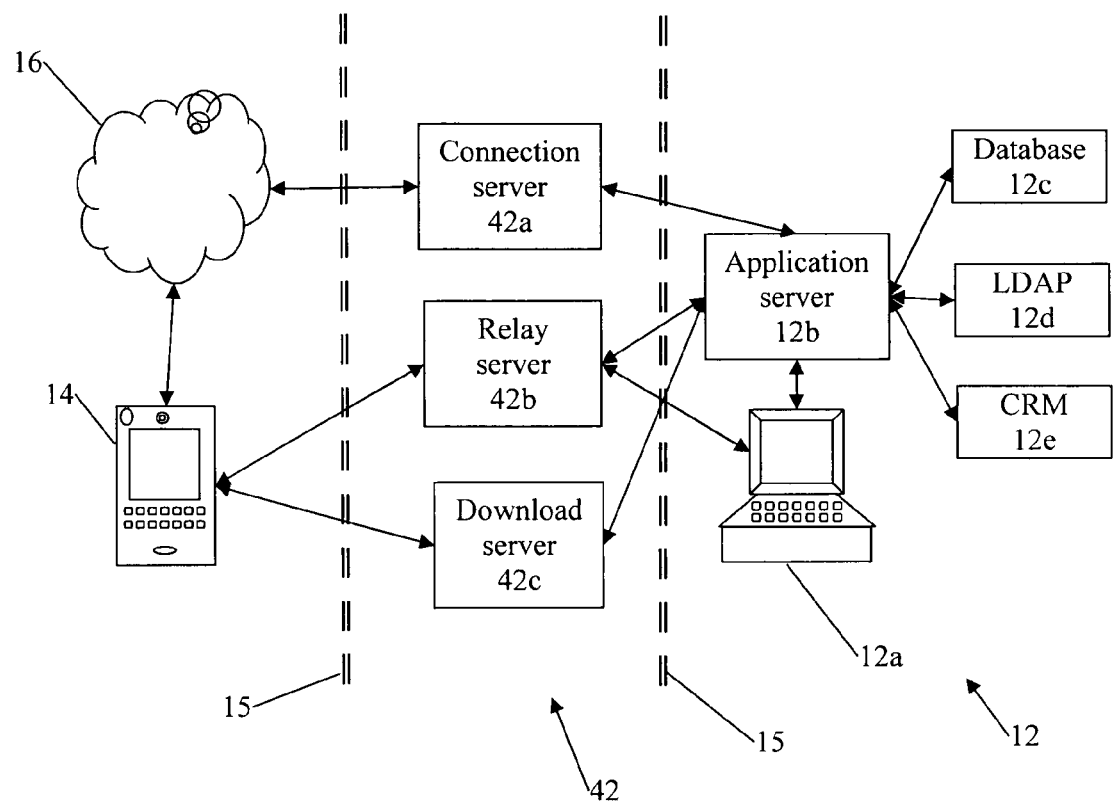
FIG. 2A illustrates the architectural flow of a remote device management system in accordance with some embodiments of the present invention.

FIG. 2A illustrates the architectural flow of a remote device management system in accordance with some embodiments of the present invention. Communication between server 42 and each of network 16, mobile device 14, and remote station 12, may be regulated by firewalls 15.

Server 42 may include one or more modules. The modules may reside on a single processor device, or may reside on a plurality of cooperating processor devices. For example, server 42 may include connection server 42a for establishing a connection between mobile device 14 and remote station 12, relay server 42b for enabling communication between mobile device 14 and remote station 12, and download server 42c for transferring data or applications to mobile device 14 or remote station 12.

Similarly, remote station 12 may include one or more modules. The various modules may reside on a single device, or may reside on a plurality of cooperation devices. For example, remote station 12 may include user console 12a for enabling a station user to operate remote station 12, application server 12b for operating a station client application, database module 12c for communicating with a database of previous sessions or other data useful in to providing service to mobile device 14, lightweight directory access protocol (LDAP) module 12d for establishing authorization for a station user, and customer relationship management (CRM) module 12e for managing client accounts associated with various mobile devices 14.

Figure 2B:
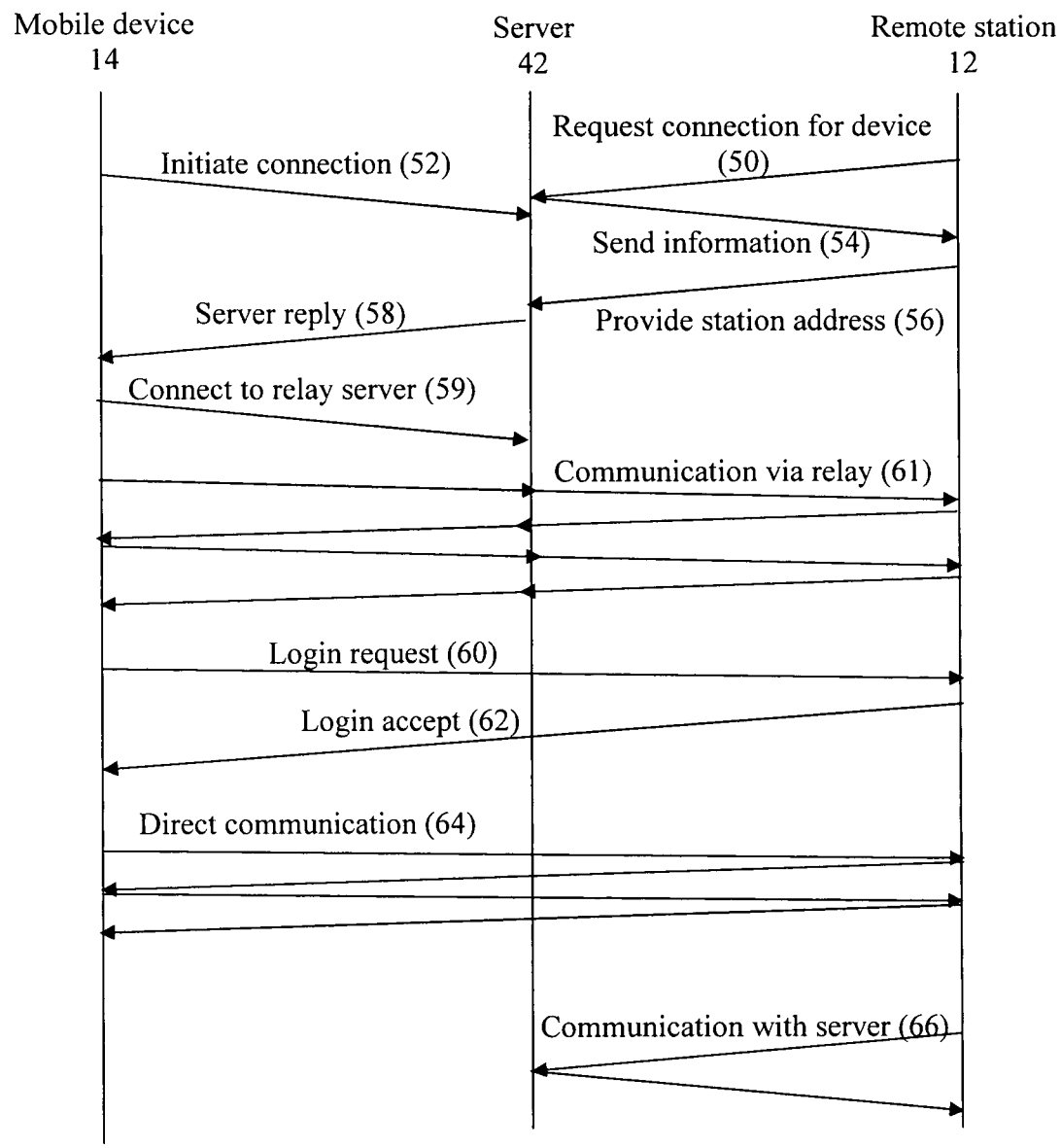
FIG. 2B illustrates establishment of communication between a mobile device and a remote station, in accordance with some embodiments of the present invention.

FIG. 2B illustrates establishment of communication between a mobile device and a remote station, in accordance with some embodiments of the present invention. Reference is also made to components shown in FIG. 2A. It should be understood by one skilled in the art that method steps shown in the Figures are illustrative only, and that at least some of the steps may be omitted or performed in a different order without affecting the outcome. It should also be understood that the division of actions into discrete steps is for convenience only, and alternative divisions may be possible without affecting the outcome.

For example, a device user at mobile device 14 and a station user at mobile station 12 may have initiated contact. For example, the device user may have made a telephone conversation to, or initiated an exchange of text messages with, the station user, or vice versa. As a result of the contact, the station user may decide to remotely operate mobile device 14. For example, the contact may have established that a problem needs to be corrected, that the device user requires instruction with regard to operation of mobile device 14, or that an application should be installed on mobile device 14.

If mobile device 14 has not been installed with an appropriate device client application, the station user may instruct the device user as to how to obtain and install the application. For example, the station user may send the device user a link to download the device client application via Multimedia Messaging Service (MMS) or SMS. Such a MMS or SMS transmission may include a personal identification (PIN) number or alternative code for verification of the identity of the device user. For example, identification of the mobile device may be verified by obtaining the International Mobile Subscriber Identity (IMSI) and Mobile Subscriber Integrated Services Digital Network (MSISDN) numbers of mobile device 14. The station user may continue to communicate with the device user in parallel, for example, by the device user using a speaker phone option of mobile device 14. For example, the station user may instruct the device user on how to install and activate the device client application.

At this point, the station user may operate user console 12a of remote station 12 so as to signal connection server 42a that a specific mobile device 14 is going to attempt a connection (step 50). This may involve starting the station client application. For example, CRM module 12e may be accessed via application server 12b to obtain account information associated with mobile device 14. During startup of the station client, the station client may authenticate the identity of the station user, for example, by requesting the station user to enter identifying information and by accessing LDAP 12d via application server 12b.

For example, application server 12b may select a relay server 42b for the current session. Application server 12b may connect to connection server 42a and instruct it to direct connection of mobile device 14 to selected relay server 42b. Application server 12b may then notify relay server 42b regarding the upcoming connection. Application server 12b may then direct the station client to selected relay server 42b. The station client may then connect to selected relay server 42b.

Concurrently, the device client on mobile device 14 may connect to connection server 42a via the Hypertext Transfer Protocol (HTTP) (step 52). (If the device client has not been already launched, the device client may be downloaded, installed, and launched at this point.) The data connection may be via a known data transfer protocol such as, for example, general packet radio service (GPRS), Universal Mobile Telecommunications System (UMTS) (3G), Enhanced Data rates for GSM Evolution (EDGE), Worldwide Interoperability for Microwave Access (WiMax), Long Term Evolution (LTE), 4G, or Wi-Fi. Connection server 42a may identify and authenticate mobile device 14. During the login process both parties agree on a level of security (e.g., communications encryption, control level), device capabilities, and connection capabilities (e.g., refresh rate, image quality).

In some embodiments of the present invention, connection server 42a may reply to mobile device 14 with the address of the relay Server and a login key. For example, the login key may include the phone number of the device (step 58). Alternatively, the login key may be a PIN number or code that points to the combination of IMSI and MSISDN numbers. The device client may then connect to relay server 42b using the login key (step 59). A connection may then be is established between the station client and the device client via relay server 42b (step 61). Via the established connection, the station user may operate mobile device 14, and disconnect mobile device 14 from the connection when finished. When the communication session is finished, the station client may send a record of the session to database 12c via application server 12b.

The station client may issue a request to a central database via application server 42a for data regarding mobile device 14 (e.g. device image, key mapping, macros, scripts, flows, OCR derived decision trees for resolution activities or sequence of activities) (step 66).

Alternatively, connection server 42a may send the station client all of the information agreed on during the login process (step 54). The login server receives from the station client (step 56) and sends to the device client (step 58) the address of the station client. The device client follows by disconnecting the connection with the login server and establishing a data connection to the station client (steps 60 and 62). The new connection continues with the same parameters agreed on during the initial login.

At all times during the login process and thereafter, a voice telephone call between the device user and the station user may continue. Once the login process is completed, the device client may continue to communicate with the station client (step 64). For example, the device client may send to the station client device specific information and diagnostics.

When the station user wishes to end remote operation of mobile device 14, for example, when a problem has been resolved, the station user may operate the station client to generate a visible or audible notification on mobile device 14. The station client may send a disconnect command to the device client, causing the connection to be disconnected. At this point, the station client may send a record of the session to a central database. For example, the station client may communicate with server 42 (step 66).

Figure 3:
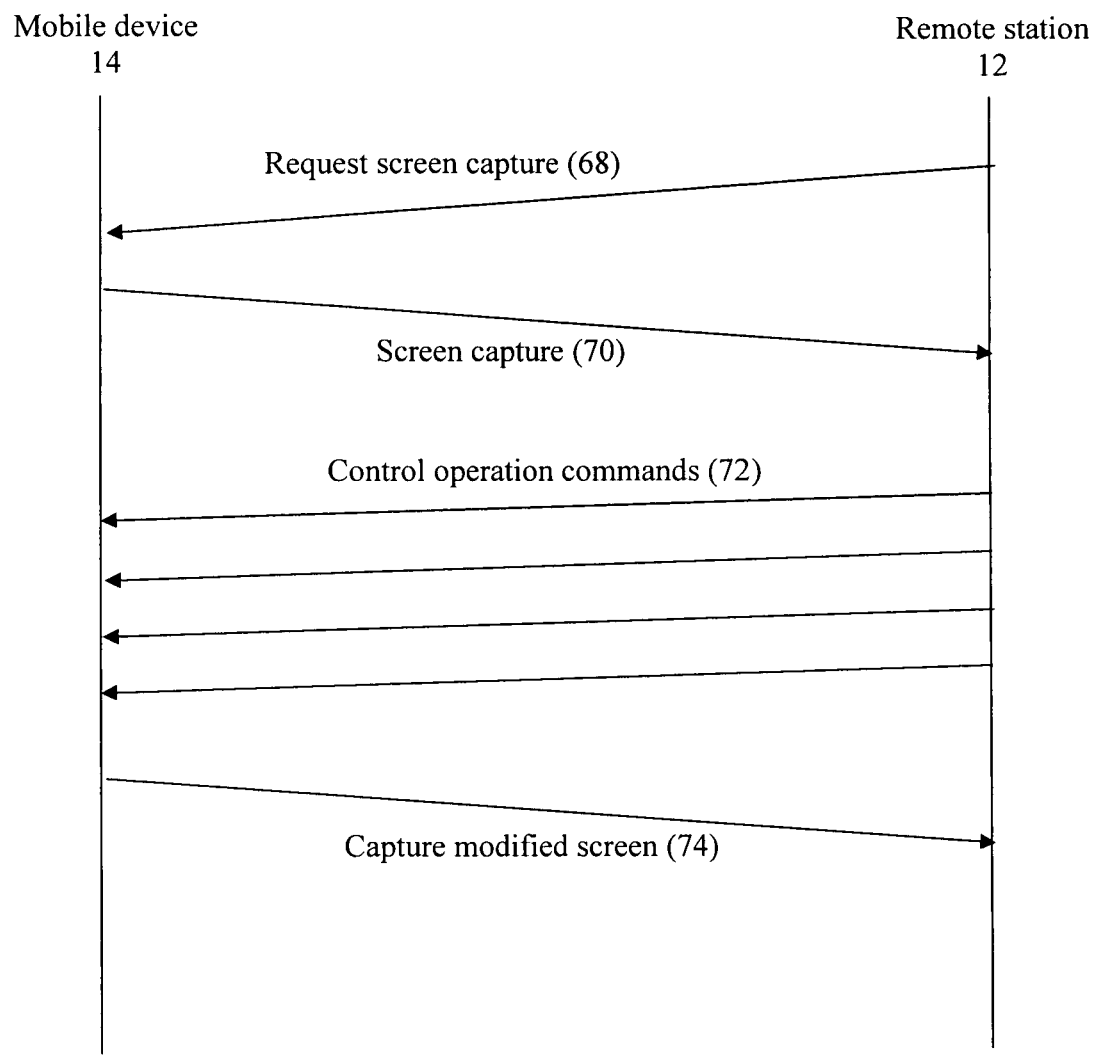
FIG. 3 illustrates remote operation of a remote device in accordance with some embodiments of the present invention.

FIG. 3 illustrates remote operation of a remote device in accordance with some embodiments of the present invention. For example, the station client may request from the device client to send device display data (screen capture) that is currently displayed on mobile device 14 (step 68). The device client may then send data from one or more captured screens to the station client (step 70). The station user may then view a display of mobile device 14 in real-time. The rate of screen capture may be based on the refresh rate agreed upon in the login process. At any point, the device client may compare a captured screen to a previously captured screen. If the captured screens are identical or sufficiently similar as defined by predefined criteria, the device client may return to an idle state. However, if a difference is detected between the two captured screens, an area of the captured screen that contains the differences (typically, the smallest rectangular area containing the differences) between the two captured screens may be sent to the station client. Typically, the area may be converted to a Joint Photographic Experts Group (JPEG) format image, with a quality agreed upon during the login process, and sent to the station client along with the coordinates of the area.

In addition, a station user operating the station client on remote station 12 may operate mobile device 12. For example, the station user may generate the results of key presses or other manipulations of controls on mobile device 12 (step 72). For example, a message indicating operation of a device control may be sent to the device client. Mobile device 12 may respond accordingly, for example, by launching an application or changing a displayed image. This control operation process may continue concurrently with the screen capture process. Thus, the station user may continue to monitor mobile device 12 and monitor the effects of the control operation process on mobile device 12 (step 74). This cycle of control operation and screen capture may be repeated many times until the issue is resolved.

Concurrently with the control operation and screen capture processes, the station user may continue to talk to the device user via the telephone function of mobile device 14. For example, the station user may explain to the device user what is being done to mobile device 14, or teach the device user how to operate mobile device 14.

In accordance with some embodiments of the present invention, the station user may operate the mobile device 14 so as to cause mobile device 14 to display information to the device user. For example, the station user may operate remote station 12 to display an image on display screen 18 (FIG. 1) of mobile device 14. For example, the station user may mark one or more menu items that are displayed on display screen 18 in order to instruct the device user in the proper use of mobile device 14. The station user may operate remote station 12 to indicate to a station client application the intention to display information on display screen 18. A virtual screen display showing the displayed contents of display screen 18 may appear on station screen 36 (FIG. 1) of remote station 12. The station user may manipulate an input device such as a mouse, joystick, trackball, or touch pad so as to move a cursor over the virtual screen display. The station client application sends the coordinates of the position of the cursor to mobile device 14. In this manner, a cursor or drawn mark appears at the corresponding position on station screen 36. For example, holding a mouse button while moving the mouse may cause a line to be drawn on display screen 18. This process is independent of the screen capture process and may take place concurrently. Thus, the screen user may monitor on station screen 36 the results of the drawing process on display screen 18. Alternatively, the station user may operate remote station 12 to cause one or more predefined marks or images to appear on display screen 18. For example, an icon or other feature on the screen may be marked by being circled. The station client application may be configured so that such marks fade or vanish after a predetermined period of time. Similarly, the station client may be configured so as to enable the station user to erase any or all marks or image components added to the image displayed on display screen 18.

In accordance with some embodiments of the present invention, a station user may retrieve data that is stored on mobile device 14. Remote station 12 may enable the station user to view the retrieved data in modes not available to a device user of mobile device 14. For example, such retrieved data may be used to diagnose a problem with mobile device 14. For example, the station user may be enabled to manipulate data in a contact book stored in a data storage component of mobile device 14. For example, a device user may operate a remote station (acting as a station user) to add, remove, or modify information in the contact book in a simpler or more convenient manner that is possible via controls of mobile device 14. Similarly, a station user may wish to check or modify the status of one or more data files in a data storage component of mobile device 14.

In accordance with some embodiments of the present invention, a device client application running on a mobile device 14 may be configured to diagnose mobile device 14. The diagnostic information may be reported to a station user at a remote station 12. For example, a station user may request the device client to run one or more diagnostic programs. For example, the device client may report on the status of the device (e.g. battery status, speaker volume, allocation of memory, firmware version), of the network (e.g. signal strength, name of device user, phone number), and of the connectivity (e.g. Bluetooth, Wi-Fi). The information that is reported to remote station 12 may be analyzed by an analysis program. For example, the analysis program may detect a potential software/firmware conflict or a needed upgrade.

A station user may operate remote station 12 to perform other operations on mobile device 14. For example, the station user may view a list of applications currently installed or running on the mobile device. For example, the station user may send a device client application running on mobile device 14 a request for the list of installed or running applications. The device client may the send back information regarding installed or running applications. The information may include, for example, an application name, an identification (ID) code, or a version. The station may launch one of the applications by sending the device client information about that application. The device client may then verify that the application requested is actually installed and if it is the application is launched.

In accordance with some embodiments of the present invention, some device related issues may be resolved using a fixed sequence of operations remotely performed on mobile device 14. For example a Global Positioning System (GPS) navigator program may fail to download a map from a main server because of erroneous server and connection settings. Such an issue may be solved by overwriting all of the program's settings with the correct ones.

Such issue scenarios may be identified in advance. For each such scenario, a predefined sequence of commands causing simulated device operations, or macro, may be defined. When the macro is activated, each command of the macro is executed in sequence. For example, a command may simulate an operation such as a key press, touch screen click, alphanumeric input, launch or stop an application, open the device's browser application to a specific uniform resource locator (URL) address, draw or write on a display screen, wait for a predetermined period of time before executing the next command of the macro, display text or image at remote station 12, or send or install a file on mobile device 14.

Other types of macros may enable, for example, navigating to a certain location in mobile device (shortcut macros), downloading a file, launching a URL with a download link, sending a file to or installing a file on mobile device 14, displaying instructions regarding how to perform a certain operation (e.g. add a contact) at remote station 12 or on mobile device 14. The macro may be a hybrid macro including multiple steps such as, for example, downloading an application, launching an application, filling in data fields by a station user or with predefined data. A new macro may be added, or an existing macro modified, by a station user operating remote station 12.

For example, a station user may start the running of a macro in response to a detected or described problem with mobile device 14. Remote station 12 may then follow the macro, sending the commands of the macro, one at a time, in the sequence defined by the macro. The device client may receive the commands of the macro in a similar manner to receiving commands generated by the station user operating remote station 12. If the macro contains information to be conveyed to the station user, it may be displayed during the run of the macro at remote station 12.

Embodiments of the present invention may also enable advanced macros. For example, the resolution of some device related issues may require making decisions based on a current status of mobile device 14. Thus, the process of resolving an issue may branch into more than one route due to a particular circumstance. For example, execution of a command of a macro may depend on mobile device 14 having responded to a previous command. For example, in order to avoid synchronization problems, it may be necessary to delay execution of a command until a display has been updated or diagnostic information returned.

Alternatively, a macro may branch on the basis of differences between one device and another (resulting from, for example, differences in software installed on the device or different Firmware versions), or other variable circumstances. For example, a macro may be configured to define push email. The macro may issue a predefined set of commands to override push email settings and try to connect to a push email server. At this point, if it is determined that the server is not responding, another macro may be run with a different push email server address.

For example, a decision within a macro may be based on a comparison between a captured screen configuration and an expected screen configuration, or on an analysis of a captured screen. For example, the decision may be based on the content of text appearing in the captured screen and interpreted by an OCR algorithm. Alternatively, a decision within a macro may be based on diagnostics being run on the device as part of the macro.

For example, a macro to turn on Bluetooth for mobile device 14. The macro may then include a command that checks whether Bluetooth has indeed been turned on. In the event that it has not, the macro may repeat the attempt to turn on Bluetooth.

The macro may continue in the appropriate branch based on the results of the decision. If no decision can be made, for example, a captured screen image or returned diagnostic value does not match any of the expected options, a default option and corresponding branch may be defined.

A system and method of remote mobile device management in accordance with embodiments of the present invention may include screen capture. For example, the system may be configured to send a modified part of an image displayed on a display screen of mobile device 14 to remote station 12. For example, a screen capture program running on mobile device 14 may capture a currently displayed image and identify differences between the captured image and a stored previously captured image. The program may then identify the smallest rectangular area or areas of the image that include all of the differences. For example, the program may create a rectangular region around each individual difference with a rectangle. The program may then join nearby individual rectangular regions to form a few larger rectangular regions. The rectangular regions may be converted into an appropriate JPEG, Portable Network Graphics (PNG), or Graphics Interface Format (GIF) image format with a required quality. The converted image and its coordinates within the entire captured image may be sent to remote station 12. At remote station 12, an image reconstruction program may insert the received rectangular image into a stored previously captured image so as to display the image as currently displayed on mobile device 14.

In accordance with embodiments of the present invention, a speed of the network may be determined. Aspects of communication between remote station 12 and mobile device 14, for example, the quality of captured screens sent over the network, may depend on the determined network speed. For example, the remote mobile device management system may measure the amount of time required to send an image from mobile device 14 to remote station 12 and back. For example, a clock may be started when an image is sent from mobile device 14 to remote station 12. When the image is received at remote station 12, an acknowledgment signal is sent from remote station 12 to mobile device 14. When mobile device 14 receives the acknowledgment signal, the clock is stopped.

In accordance with some embodiments of the present invention, more than one image may be sent by mobile device 12 before an acknowledgment signal is received. In this case, each image sent and the acknowledgment signal for that image may be provided with a unique identifying serial number. A counter may be provided to ensure that the number of images sent does not exceed the number of acknowledgement signals received by a predetermined amount (represented by X).

Figure 4:
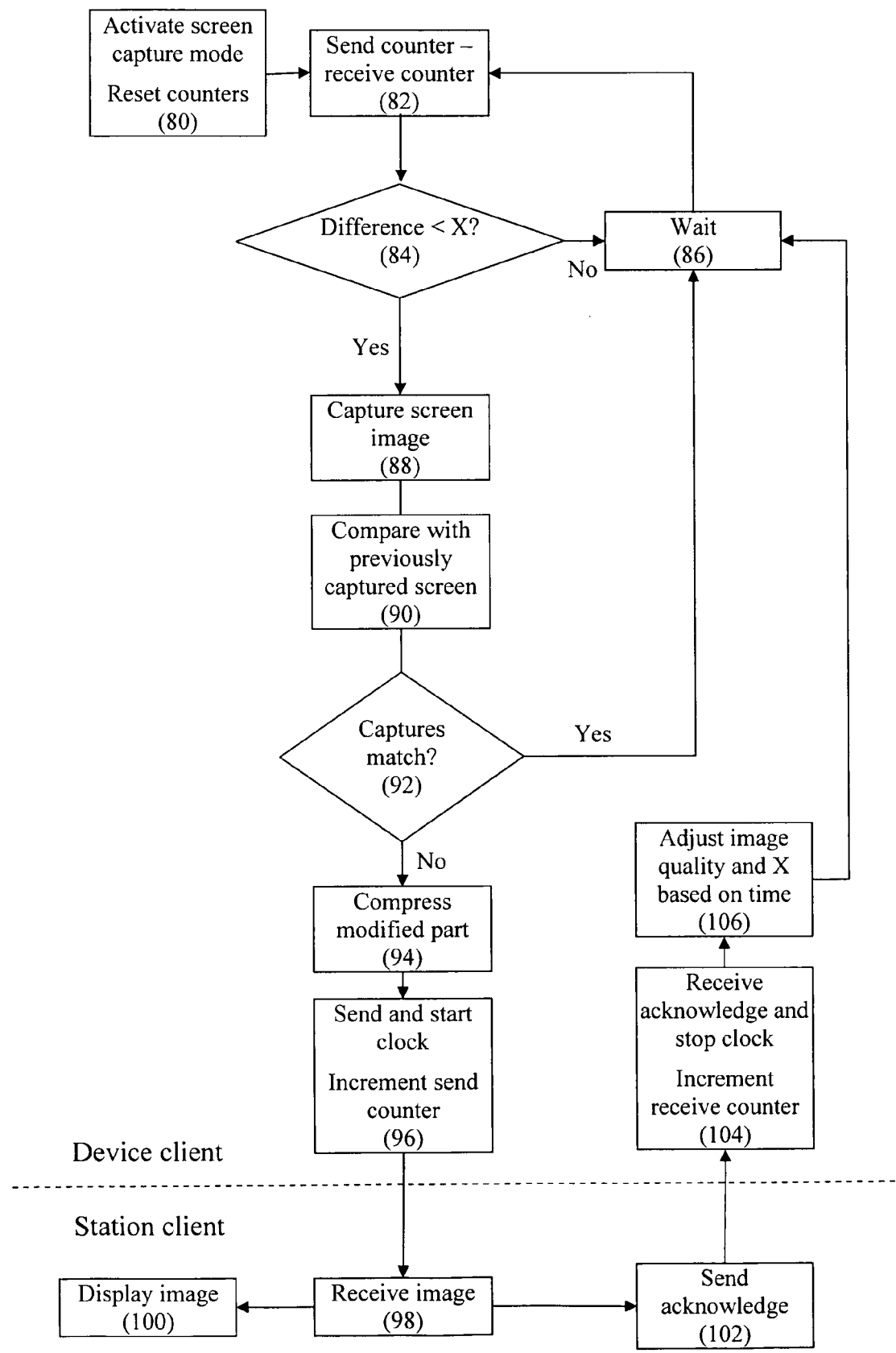
FIG. 4 illustrates a method for sending a captured screen image with adjustments based on network speed, in accordance with some embodiments of the present invention.

FIG. 4 illustrates a method for sending a captured screen image with adjustments based on network speed, in accordance with some embodiments of the present invention. As indicated by the dashed line, some of the steps are performed by a device client application running on a mobile device, while others are performed by a station client application operating on a remote station.

In response to a command sent from the remote station, the device client activates screen capture mode (step 80). Counters of the number of images sent (send counter) and of the number of acknowledgment signals received (receive counter) are reset to zero. At predetermined intervals, perhaps at the image refresh rate on a display of the mobile device, the difference is calculated between the values of the send counter and the receive counter (step 82). The difference is then compared with the maximum allowed difference X (step 84). If the difference is greater than or equal to X, no further images may be sent and the system waits for a predetermined time interval. If the difference is smaller than X, an image displayed by a display screen of the mobile device may be captured (step 88). The captured screen image is compared with a stored image representing a previously captured screen at least part of which was sent to the remote station (step 90). If the captured screen image is substantially identical (as defined by predetermined criteria) to the previously captured screen image, the system waits (step 86). If differences exist between the captured screen and the previously captured screen, the differences in the image are extracted as described above and converted or compressed to an appropriate image format (step 94). The captured screen image is saved in place of the previously captured image. An identifying serial number is attached to the converted image, the send counter is incremented, an associated timer clock is started, and the converted image is sent over the network to the remote station (step 96).

The station client running on the remote station may then receive the image from the network (step 98). The station client may insert the received image data into a previously received image and cause the new image to be displayed (step 100). The station client sends an acknowledgment signal containing the received serial number to the mobile device over the network (step 102). The device client may receive the acknowledgment signal (step 104). The device client stops the associated clock and reads a current communication time. The communication time together with the known quantity of the data sent may serve as an indication of current network speed or bandwidth. On the basis of the read time, the device client may adjust the quality of future images that are sent to the remote station. In addition, the device client may adjust the value of X, possibly affecting the capture and sending rate. For example, the device client may be programmed with one or more parameters that represent various network speeds, to be compared against a calculated current network speed. In order to reduce the effects of momentary fluctuations, any adjustments may be based on a weighted average of the currently measured communication time and previously measured communication times.

For example, the device client may compare a calculated bandwidth value against a stored baseline number. For example, minimum and maximum parameters may be defined so as to avoid unacceptably low image quality, on the one hand, and unnecessary loading the network on the other. The station client may modify these parameters as needed, for example, to improve image quality or refresh rate.

For example, if the network is slow and the screen of the mobile device changes very frequently, several consecutive screen captures may be sent slowly, resulting in a slow refresh rate on a screen of the remote station. In this case, adjusting X may enable more efficient use of the network.

As another example, a session may be running under a 3G (or more advanced) communications standard that enables concurrent transmission of data and voice signals. A network problem may cause the communications standard to drop to 2G. In this case, only voice is transmitted. Thus, data transfer may stall with no indication, while both the device client and that station client continue to attempt to send data. For example, Transmission Control Protocol (TCP) local send buffers may full, possibly causing an application to lock. Thus, the value of X may be selected to ensure that an excessive amount of image data has not been sent until previously sent image data has been acknowledged. Attaching an identifying serial number to each image and corresponding acknowledgment signal sent may also enable verifying which data sent by the mobile device has been received by the remote station. Without the serial number, for example, an unexpected disconnection from and reconnection to the network could have mislead the system regarding which images were in fact received.

A system and method of remote mobile device management in accordance with embodiments of the present invention may customer profiling. For example, a station client application may extract customer related information from the mobile device. such information may include, for example, installed applications, utilization of installed applications, memory content, recent usage, and contact information. A profile application may analyze the extracted information and classify the device user into one or more categories. The classification may be based on such factors that may be at least approximately derived from the extracted data. Such factors may include, for example, interests, occupation, travel, digital lifestyle, or socio-demographic attributes of the device user. Such factors may be represented by a defined digital life style persona. A correlation application may then correlate the classification of the device user with others device users. An advisor or sales representative may then recommend to the device user modifications of the mobile device to enhance the usefulness or convenience of the mobile device. For example, a recommendation may be based on predefined business rules, algorithms, decision trees, models based on similar profiles and offers suggested to them, or Rete algorithms. Similarly, an algorithm may analyze the impact of a recommendation on such factors as, for example, user experience, customer loyalty, and device utilization. Alternatively, a digital profiling process may run on the mobile device itself, without exporting the relevant data to an external processor or station for analysis.

For example, if a mobile device is programmed with an old version of a game, a sales or service representative may recommend a version upgrade to the device user. As another example, if the mobile device includes an application that is part of an application suite, a representative may offer the device user more applications from that suite.

Similarly, when attempting to solve a problem with a mobile device, a service representative may operate a remote station to assist in diagnosing the mobile device. The remote station may retrieve from the mobile device information that may help in diagnosing and servicing the mobile device. For example, such retrieved information may include: diagnostic information, installed applications, running applications, and disk and memory usage. A diagnosis application may then attempt to detect any incompatibility implied by the retrieved information.

A device user may wish to resolve an issue with regard to a mobile device without involving an external service representative. In this case, the device user may operate a remote station to operate the mobile device. For example, the device user may operate the mobile device in a self service mode. A self service application is started on the mobile device. The self-service application may connect to a login server and authenticate its identity. A connection may then be made to a self-service application server. The application may request the self-service application server to send a list of macros relevant to the mobile device. For example, the self-service application may display a menu of macros and their descriptions. The device user may select one of the macros to run. The self-service application may then invoke the requested macro via the self-service application server to run the requested macro. Optionally, the macro may send a file or application to the mobile device. The mobile device may run the sent application independently of the remote station. When the invoked macro has finished executing, the self-service application server may notify the self-service application that the macro has completed. The self-service application may display this notification to the device user. The device user may again select a macro to run or may quit the self-service application.

Alternatively, the device user may launch on a computer (either associated with the mobile device or separate) a web browser to the URL of a self-service Internet site associated with the mobile device. For example, the self-service site may prompt the device user to enter a telephone number associated with the mobile device. The self-service site may then request that the device user launch a corresponding self-service application on the mobile device. As in other cases, the mobile device may connect to a self-service application server and authenticate itself. A connection is then made to the self-service application server. The device user may then also act in the capacity of the station user by operating a remote station via the computer and the self-service site. For example, the self-service site may enable the device user to run one or more available macros or otherwise operate the mobile device. When finished, the device user may close the self-service site web page. Once the self-service site self-service site is closed, a disconnect message may be sent to disconnect the mobile device from the self-service device application.

Figure 5:
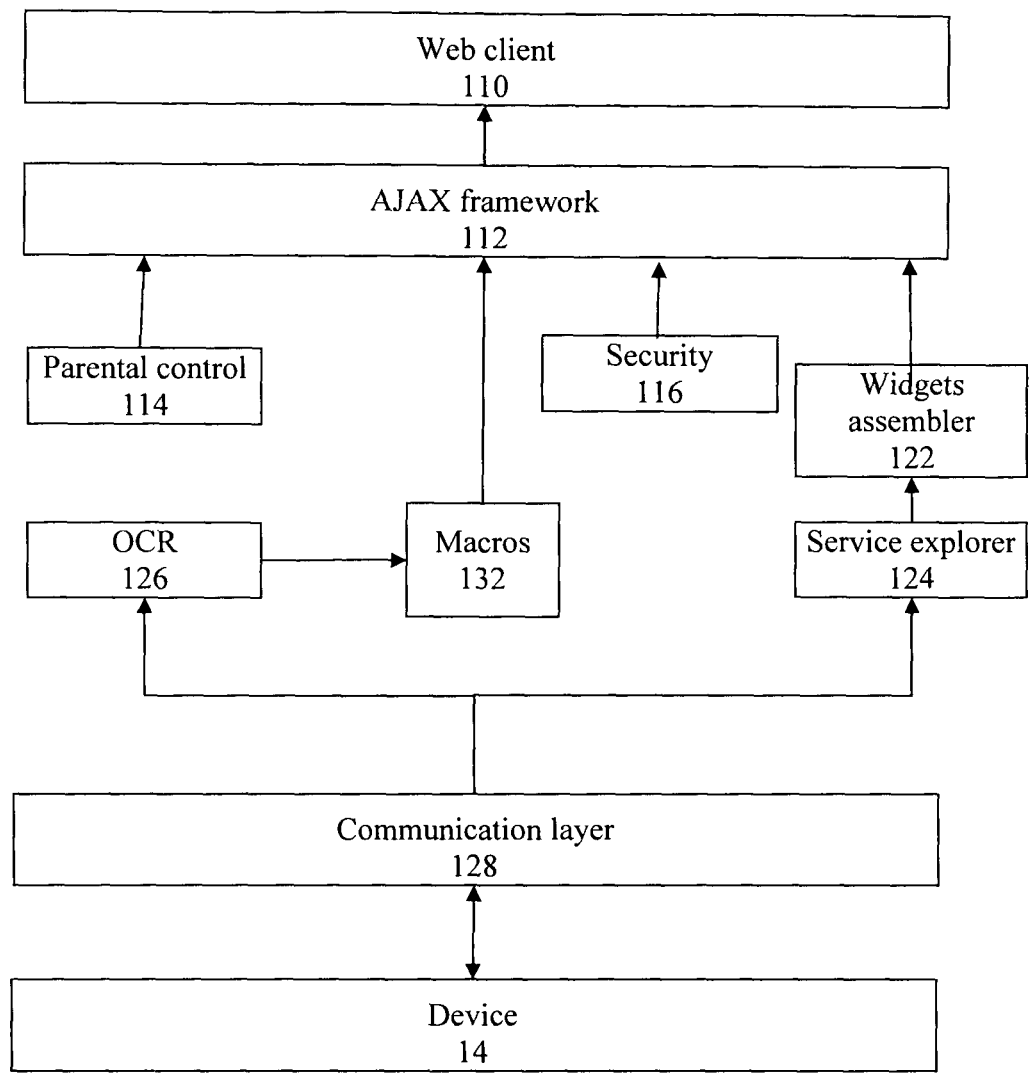
FIG. 5 illustrates the architecture of a self-service portal in accordance with some embodiments of the present invention.

FIG. 5 illustrates the architecture of a self-service portal in accordance with some embodiments of the present invention. Communication layer 128 is responsible for connection flow, management of network connection stability, identifying mobile device 14, performing load balancing and ensuring security and connection encryption. OCR 126 is responsible for translation of images into text. Macros 132 run in response to commands issued by administration console 132. Advanced OCR algorithms integrated with macros 132 may enable the definition of and execution of macros based on text data displayed on a mobile device 14. Service explorer 124 may identify and track which tools and applications reside on mobile device 14 and require representation by a widget in the self-service portal. Widgets assembler 122 may construct and provide widgets, each representing a tool or application residing on mobile device 14.

In addition, other functions may be provided by a self-service portal. For example, security application 116 may include a Java based application for operating security features. For example, the application may include integration with a GPS for location tracking of mobile device 14, enabling of remote data erasure and backup, and for controlling access to external provider sites.

As another example, parental control application 114 may enable tracking words and links related to particular content. For example, the particular content may include objectionable content that a parent may consider unsuitable for a child. The application may enable limiting access to the objectionable content, or may alert a parent regarding an attempt to access the objectionable content. As another example, a parent may enter via parental control application 114 one or more key words or words strings that may indicate a problem with the child, such as psychological stress or inappropriate social interactions. For example, such words or strings may be derived from a provided library, or may be user defined. Parental control application 114 may detect excessive or continued use of such words or strings and generate an alert to the parent.

An asynchronous JavaScript and XML (AJAX), or similar, framework may enable a browser-based, dynamic desktop that simulates and reflects the applications and content of mobile device 14. Web client framework 110 may develop Ajax or similar web components that can integrated with the other components. Code may be automatically generated based on simple relationships that significantly streamline client code.

A device user operating the self-service portal may manage such features of mobile device 14 as, for example, communication elements, content, configuration, applications, content security, parental control, and diagnostics and troubleshooting.

A device user operating the self-service portal may perform operations base on a digital lifestyle profile or persona. Such operations may include, for example, comparison of the digital profile with generic digital profiles or with recommendations based on social networking. A device user operating the self-service portal may manipulate content of the digital profile, for example, by filtering or ranking the content. On the basis of the content, connection may be made with a product catalog or applications store. The self-service portal may recommend applications or products to be downloaded or installed, based on the digital profile. A device user operating the self-service portal may view the effect of any newly downloaded or installed products or applications on the digital profile.

Figure 6:
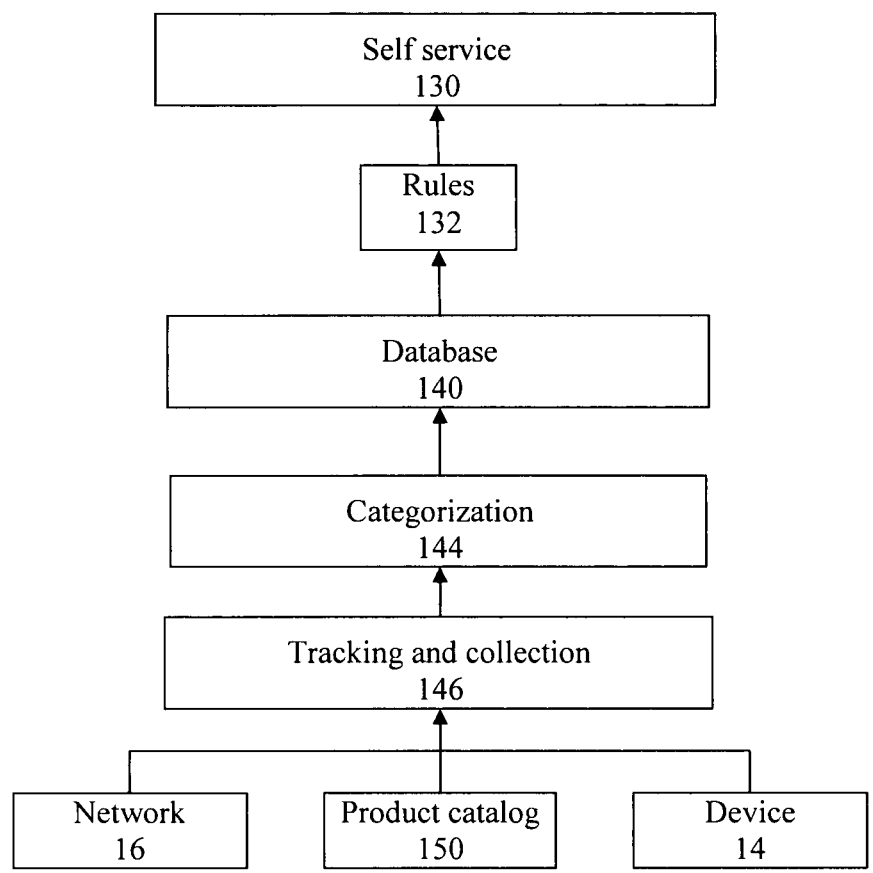
FIG. 6 shows the architectural flow of self-service digital lifestyle management, in accordance with some embodiments of the present invention.

FIG. 6 shows the architectural flow of self-service digital lifestyle management, in accordance with some embodiments of the present invention. Tracking and collection engine 146 may extract profile and product data from various sources. Such sources may include, for example, one or more mobile devices 14, a network 16 (e.g. the Internet), and one or more product catalogs 150.

Data collected by tracking and collection engine 146 may be forwarded to categorization engine 144. Categorization engine 144 may categorize or rank collected data. For example, categorization or ranking may be based on business orientation, lifestyle (e.g. sports, games, or music interests), profitability, or marketing. Collected and categorized data may be saved in database 140. Database 140 may manage and retrieve profile or product data for operations such as, for example, profiling, segmentation, and recommendation. In addition, historical data may be collected from external archives.

Rules engine 132 establishes connections between data of database 140. For example, rules engine 132 may continuously track, filter, correlate, or transform newly collected data. Furthermore, rules engine 132 may define associations and correlation between the profile and product data. Rules engine 132 may define a digital profile by application of a taxonomy algorithm. Rules engine 132 may generate a recommendation for a device user to purchase or otherwise acquire a product based on any defined associations. Rules engine 132 may perform such analysis as assessing the likelihood of a user to purchase a particular product or family of products.

Any recommendations generated by rules engine 132 may be brought to the attention of a device user via self-service portal 130.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method comprising:
 executing a first macro to activate, in relation to a mobile device, a screen capture mode;
 starting a clock in response to a sending of a first screen image captured in conjunction with the screen capture mode;
 receiving, from the mobile device, the first screen image captured in conjunction with the screen capture mode;
 stopping the clock in response to receipt of the first screen image to determine a communication time associated with the first screen image;
 processing the first screen image using optical character recognition (OCR) to extract text data from the first screen image;
 comparing the text data as extracted from the first screen image with an expected screen configuration;
 defining, based on the comparison of the text data text data with the expected screen configuration, a second macro;
 in response to an execution of the second macro, receiving a modified part of a second screen image captured based on a determination that a number of images sent by the mobile device is within a defined maximum allowed difference of a number of acknowledgement signals sent with respect to images received from the mobile device, wherein a quality of the second screen image is adjusted based on the communication time associated with the first screen image;
 comparing the second screen image with the first screen image to identify one or more differences between the second screen image and the first screen image;
 creating one or more regions within the second screen image around each of the one or more differences;
 joining the one or more regions into one or more larger regions;
 converting each of the one or more larger regions into a defined image format; and
 inserting each of the one or more larger regions, as converted, into the first screen image based on one or more coordinates of the one or more larger regions within the second screen image.

2. The method of claim 1, further comprising detecting a problem with respect to the mobile device.

3. The method of claim 1, further comprising combining the first screen image with a previously captured image to generate an image currently displayed at the mobile device.

4. The method of claim 1, wherein receiving a first screen image further comprises receiving one or more coordinates associated with the first screen image.

5. The method of claim 1, further comprising detecting a problem in relation to the mobile device.

6. The method of claim 5, further comprising providing, to the mobile device and based on the detected problem, a first command.

7. The method of claim 6, wherein processing the first screen image comprises processing the first screen image using optical character recognition (OCR) to (a) extract text data from the first screen image and (b) determine a response of the mobile device with respect to the first command.

8. The method of claim 7, wherein defining a second macro comprises defining, based on (a) the comparison of the text data text data with the expected screen configuration and (b) the response of the mobile device with respect to the first command, a second macro.

9. A system comprising:
 a processing device configured to:
  execute a first macro to activate, in relation to a mobile device, a screen capture mode;
  start a clock in response to a sending of a first screen image captured in conjunction with the screen capture mode;
  receive, from the mobile device, the first screen image captured in conjunction with the screen capture mode;
  stop the clock in response to receipt of the first screen image to determine a communication time associated with the first screen image;
  process the first screen image using optical character recognition (OCR) to extract text data from the first screen image;

compare the text data as extracted from the first screen image with an expected screen configuration;

define, based on the comparison of the text data text data with the expected screen configuration, a second macro;

in response to an execution of the second macro, receive a modified part of a second screen image captured based on a determination that a number of images sent by the mobile device is within a defined maximum allowed difference of a number of acknowledgement signals sent with respect to images received from the mobile device, wherein a quality of the second screen image is adjusted based on the communication time associated with the first screen image;

compare the second screen image with the first screen image to identify one or more differences between the second screen image and the first screen image;

create one or more regions within the second screen image around each of the one or more differences;

join the one or more regions into one or more larger regions;

convert each of the one or more larger regions into a defined image format; and insert each of the one or more larger regions, as converted, into the first screen image based on one or more coordinates of the one or more larger regions within the second screen image.

10. The system of claim 9, wherein the processing device is further configured to detect a problem with respect to the mobile device.

11. The system of claim 9, wherein the processing device is further configured to combine the first screen image with a previously captured image to generate an image currently displayed at the mobile device.

12. The system of claim 9, wherein to receive a first image is to receive one or more coordinates associated with the first screen image.

13. The system of claim 9, wherein the processing device is further configured to detect a problem in relation to the mobile device.

14. The system of claim 13, wherein the processing device is further configured to provide, to the mobile device and based on the detected problem, a first command.

15. The system of claim 14, wherein to process the first screen image the processing device is further to process the first screen image using optical character recognition (OCR) to (a) extract text data from the first screen image and (b) determine a response of the mobile device with respect to the first command.

16. The system of claim 15, wherein to define a second macro the processing device is further configured to define, based on (a) the comparison of the text data text data with the expected screen configuration and (b) the response of the mobile device with respect to the first command, a second macro.

17. A non-transitory computer readable medium having instructions stored thereon that, when executed by a processor, cause the processor to perform operations comprising:

executing a first macro to activate, in relation to a mobile device, a screen capture mode;

starting a clock in response to a sending of a first screen image captured in conjunction with the screen capture mode;

receiving, from the mobile device, the first screen image, the first screen image captured in conjunction with the screen capture mode;

stopping the clock in response to receipt of the first screen image to determine a communication time associated with the first screen image;

processing the first screen image using optical character recognition (OCR) to extract text data from the first screen image;

comparing the text data as extracted from the first screen image with an expected screen configuration;

defining, based on the comparison of the text data text data with the expected screen configuration, a second macro;

in response to an execution of the second macro, receiving a modified part of a second screen image captured based on a determination that a number of images sent by the mobile device is within a defined maximum allowed difference of a number of acknowledgement signals sent with respect to images received from the mobile device, wherein a quality of the second screen image is adjusted based on the communication time associated with the first screen image;

comparing the second screen image with the first screen image to identify one or more differences between the second screen image and the first screen image;

creating one or more regions within the second screen image around each of the one or more differences;

joining the one or more regions into one or more larger regions;

converting each of the one or more larger regions into a defined image format; and inserting each of the one or more larger regions, as converted, into the first screen image based on one or more coordinates of the one or more larger regions within the second screen image.

18. The non-transitory computer readable medium of claim 17, further comprising detecting a problem in relation to the mobile device.

19. The non-transitory computer readable medium of claim 18, further comprising providing, to the mobile device and based on the detected problem, a first command.

20. The non-transitory computer readable medium of claim 19, wherein processing the first screen image comprises processing the first screen image using optical character recognition (OCR) to (a) extract text data from the first screen image and (b) determine a response of the mobile device with respect to the first command.

* * * * *